UNITED STATES PATENT OFFICE.

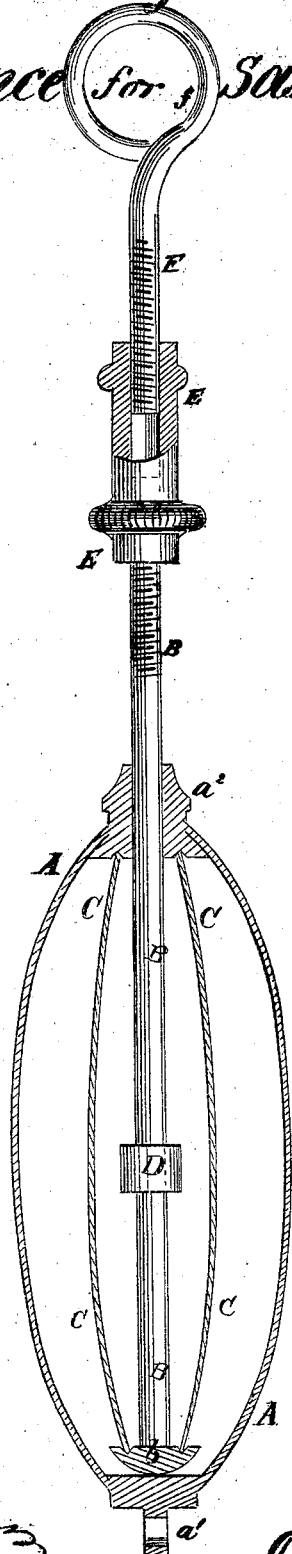

JAMES AYRES, OF PATERSON, NEW JERSEY.

IMPROVED SPRING-BALANCE FOR SAFETY-VALVES.

Specification forming part of Letters Patent No. 74,973, dated March 3, 1868.

*To all whom it may concern:*

Be it known that I, JAMES AYRES, of Paterson, in the county of Passaic and State of New Jersey, have invented a new and Improved Spring-Balance for Safety-Valve Levers; and I do hereby declare that the following is a full, clear, and exact description thereof, which will enable others skilled in the art to make and use the same, reference being had to the accompanying drawing, forming a part of this specification.

The figure is a side view of my improved spring-balance, partly in section to show the construction.

My invention has for its object to furnish an improved spring-balance for adjustably and safely securing the safety-valve levers of steam-boilers, which shall be simple in construction and easily adjusted to hold the valve closed until the pressure has reached any desired point; and it consists in the construction and combination of the various parts, as hereinafter more fully described.

A is a box or frame-work to contain the springs, and which has an eye, $a'$, formed upon one of its ends. Through the other end, $a^2$, of the box or frame A is formed a hole for the passage of the rod B, to the inner end of which is firmly attached, or upon it is solidly formed, a head, $b$, upon the inner side of which, upon the opposite sides of the rod B, are formed recesses for the reception of the ends of the springs C. The other ends of the springs C rest in recesses formed in the inner side of the head $a^2$ of the box A, upon opposite sides of the hole for the passage of the rod B. The rod B is kept in its proper position in the box A by passing through a keeper or guide, D, attached to the middle part of the said box or frame A. Upon the outer end of the rod B is cut a screw-thread, as shown in the figure.

E is a cylinder or long hand-nut, perforated longitudinally, and having a screw-thread cut in it fitting into the screw-thread cut upon the rod B.

F is a rod, having an eye, $f'$, formed upon its outer end and a screw-thread cut upon its inner end, fitting into the screw-thread cut in the long hand-nut E. The screw-threads cut upon the ends of the rods B and F are made right and left screws, so that by turning the nut E in one direction the rods B and F will be drawn toward each other, and by turning the said nut in the other direction the said rods will be pushed farther apart. The eye at one end of the spring-balance is attached or connected with the safety-valve lever of the boiler, and the eye at the other is attached to an eyebolt or other suitable support attached to the boiler.

By this construction and arrangement, by turning the hand-nut E the balance may be easily adjusted, so that the valve may be opened at any desired pressure.

Having described my invention, I claim as new and desire to secure by Letters Patent—

The spring-balance formed by the combination of the box or frame, A, rod B, having a head, $b$, formed upon its inner end, springs C, long hand-nut E, and rod F with each other, substantially as herein set forth.

The above specification of my invention signed by me this 9th day of January, 1868.

JAMES AYRES.

Witnesses:
WM. F. MCNAMARA,
JAMES T. GRAHAM.